UNITED STATES PATENT OFFICE.

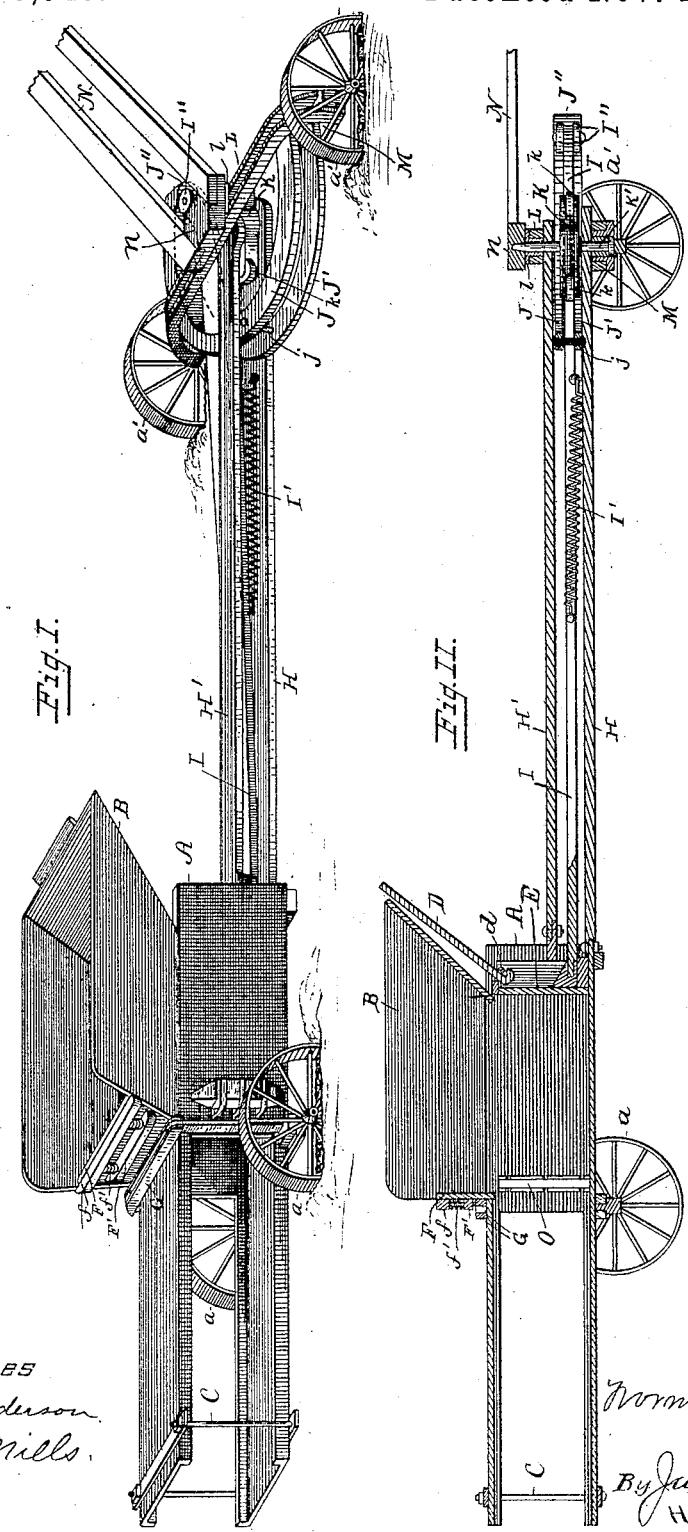

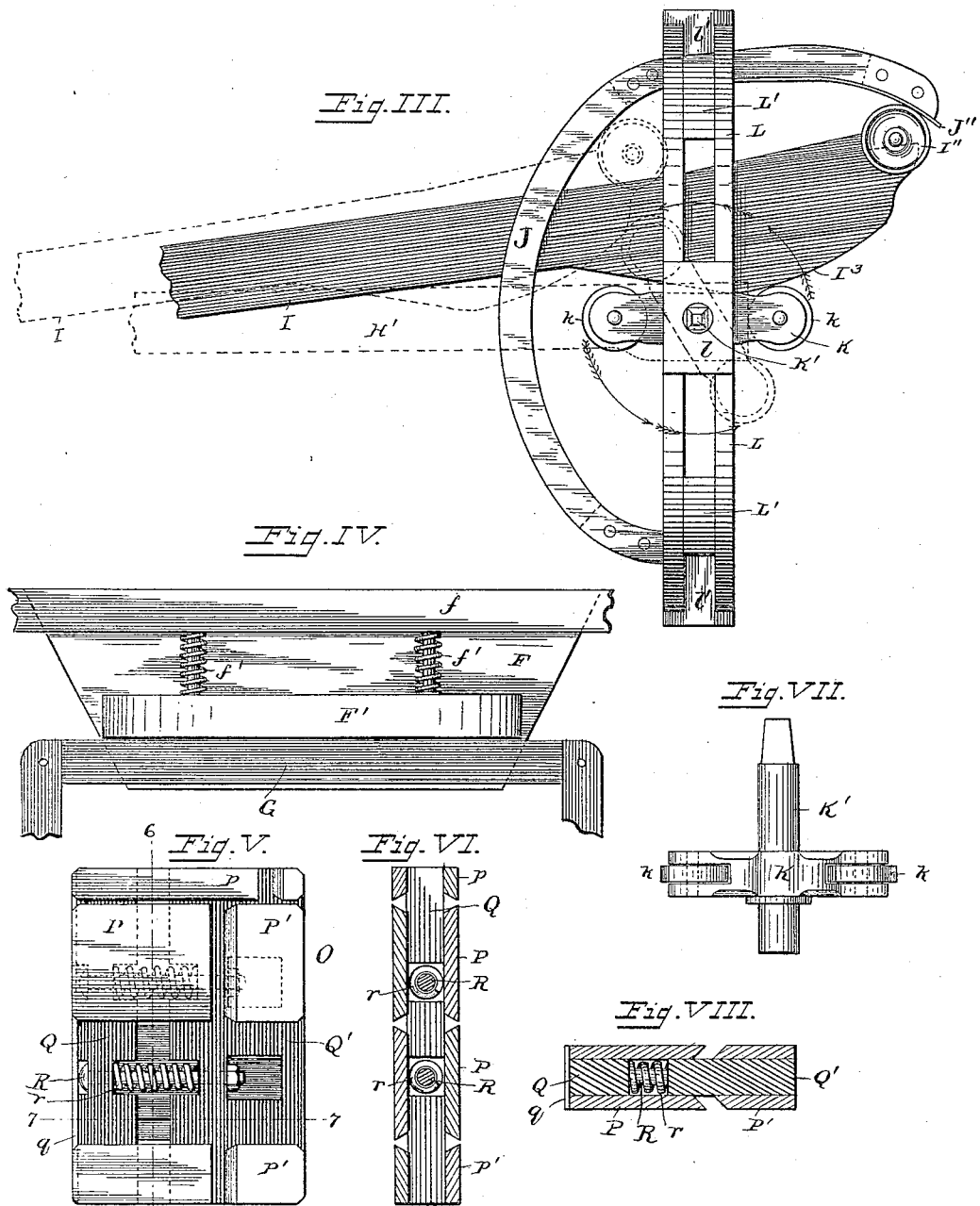

NORMAN B. WILDER, OF KANSAS CITY, MISSOURI, ASSIGNOR TO THE KANSAS CITY HAY PRESS COMPANY, OF MISSOURI.

HAY-PRESS.

SPECIFICATION forming part of Letters Patent No. 529,540, dated November 20, 1894.

Application filed May 22, 1893. Serial No. 475,116. (No model.)

*To all whom it may concern:*

Be it known that I, NORMAN B. WILDER, a citizen of the United States, residing at Kansas City, in the county of Jackson and State of Missouri, have invented certain new and useful Improvements in Hay-Presses; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in hay presses, and it consists of certain novel features hereinafter described and claimed.

Reference is had to the accompanying drawings, wherein the same parts are indicated by the same letters.

Figure I represents a perspective view of the hay press, showing the sweep partly broken away. Fig. II represents a central longitudinal section through the same. Fig. III represents an enlarged detail plan view of the mechanism which operates the pitman bar. Fig. IV represents a detail front view of the tucker, showing the springs which give it an elastic movement, rising with the pressure of the hay against it and returning to its normal conditions when the plunger returns. Fig. V represents a side view in detail of the division board; with a part of the casting removed, showing its interior construction. Fig. VI represents a longitudinal sectional view, taken on the line 6 6 of Fig. V. Fig. VII represents a detail side view of the power crank which operates the pitman. Fig. VIII represents a transverse section of the division board, taken on the line 7 7 of Fig. V.

A represents the chamber of said press.

$a$ and $a'$ represent wheels, on which said press is mounted, which wheels may be removed to allow the machine to rest on the ground, or may be let into the ground as shown in Fig. I.

B represents the hopper.

C, C, represent the tension bolts.

D represents the apron, which closes the hopper when the pitman makes the compressing stroke. The lower end of said apron is pivoted as at $d$ to the plunger-head E, which is attached to pitman I, and thus the lower end of the apron is dragged beneath the hopper at each forward stroke of the piston while the upper end rests on the top of the chamber A.

F represents the tucker secured to the tucker bar F', and forming the rear end of the hopper B.

$f$ represents a cross bar secured across the rear end of the hopper, against which cross bar the tucker works.

$f'$ are coil springs for holding and pressing the tucker downward. These springs are secured to both the cross bar $f$ and the tucker bar F', and inclose studs which work in sockets in the said tucker bar and are secured at their upper ends in the cross bar $f$. These studs allow of upward movement of the tucker within certain limits, when the hay in the chamber A presses against the bottom edge of the tucker. The springs act to hold the tucker down against the pressure of the hay.

G is a frame around the compressing chamber.

H is the connecting and supporting bed plank of the press.

H' is the upper connecting plank or plate.

I is the pitman bar.

I' is a coil-spring to give the back action to the pitman bar, one end of which is fast to the bed plank and the other fast to the pitman.

I'' is the antifriction roller on the end of the pitman bar.

I³ is the segmental projection on the end of the pitman bar for obtaining uniform pressure of the roller I'' against the power crank as it travels over the convex surface.

J and J' are semi-circular bars and guides against which the roller I'' on the pitman bar bears.

J'' is the lining on the same to form a bearing for the roller I'' to bear against.

$j$ is a brace bolt for the double purpose of strengthening the parts of the traveling bed and connecting plates, and for preventing the pitman bar from being thrown out of position or contact with the roller I'' in the traveling bed.

K is the power crank, mounted on the arbor K', and provided with antifriction rollers $k$.

L is the bearing and supporting frame, having a strengthening block or fillers L' for strengthening said frame.

$l$ is a bearing plate on said frame L to receive the arbor K', and $l'$ are end blocks in the frame L to stiffen and strengthen the same.

M is the axle frame and bearing.

N is the sweep piece secured to the sweep casting $n$ having a square interior into which fits the upper end of the arbor K' of the power crank.

O is an elastic division board.

P and P' are slats on the division board having corresponding bevels; and $p$ and $p'$ are end slats, also having corresponding bevels.

Q and Q' are center pieces to which said slats are secured.

R are bolts, connecting the parts of the division board, and $r$ are coil-springs around said bolts for giving elasticity to the movement to corresponding parts of the division board.

In the operation of my invention, the hay press being arranged at any suitable point, the propelling animal or animals are attached to the end of the sweep N, and go in a direction from right to left, in a circle about the arbor K' as suggested by the dotted lines in Fig. III. The pitman being thrown back each time by the coil-spring I' as the plunger-head passes into the baling chamber A, the lower end of the apron D, swings inward and obtains an approximately horizontal position, thereby closing the top of the baling chamber. The necessary number of strokes of the plunger to complete a bale depends on the feeder. As the bale is completed it is forced through the rear end of the baling chamber.

Having thus described my invention, what I claim, and desire to secure by Letters Patent of the United States, is—

In a rebounding-plunger hay press, the combination with the chamber A, of the hopper B; cross bar $f$ secured at the rear end of said hopper, the tucker F forming the rear end of said hopper, the tucker bar F' secured to said tucker F; the coil springs $f'$ secured to said cross bar $f$ and to said tucker bar; and studs inclosed by said coil springs secured to said cross bar $f$, and working in sockets in said tucker bar, substantially as and for the purposes described.

In testimony whereof I affix my signature in presence of two witnesses.

NORMAN B. WILDER.

Witnesses:
BESSIE E. YOUNG,
KITTIE MILLS.